United States Patent
Kim

(10) Patent No.: US 11,453,185 B2
(45) Date of Patent: Sep. 27, 2022

(54) MICROPATTERN LAYER BASED IMAGE FILM

(71) Applicant: VISUALNET INC., Gyeonggi-do (KR)

(72) Inventor: Jongyeop Kim, Gyeonggi-do (KR)

(73) Assignee: VISUALNET INC., Gyeonggi-do (KR)

( * ) Notice: Subject to any disclaimer, the term of this patent is extended or adjusted under 35 U.S.C. 154(b) by 651 days.

(21) Appl. No.: 16/447,590

(22) Filed: Jun. 20, 2019

(65) Prior Publication Data

US 2019/0299506 A1    Oct. 3, 2019

Related U.S. Application Data

(63) Continuation of application No. PCT/KR2017/013720, filed on Nov. 28, 2017.

(51) Int. Cl.
*B29C 45/14* (2006.01)
*B32B 27/08* (2006.01)
(Continued)

(52) U.S. Cl.
CPC .. *B29D 11/00278* (2013.01); *B29C 45/14811* (2013.01); *B32B 3/30* (2013.01); *B32B 7/06* (2013.01); *B32B 27/08* (2013.01); *B32B 27/36* (2013.01); *B32B 27/365* (2013.01); *B32B 37/02* (2013.01); *B32B 38/0008* (2013.01); *B32B 38/06* (2013.01); *B29C 2045/0094* (2013.01); *B29L 2011/0016* (2013.01); *B32B 2307/418* (2013.01); *B32B 2310/0831* (2013.01)

(58) Field of Classification Search
CPC .................................................. B29D 11/00278
See application file for complete search history.

(56) References Cited

U.S. PATENT DOCUMENTS

| 6,061,179 A | 5/2000 | Inoguchi et al. |
| 2014/0376088 A1 | 12/2014 | Kim et al. |
| 2016/0202491 A1 | 7/2016 | An |

FOREIGN PATENT DOCUMENTS

| CN | 105425406 A | 3/2016 |
| JP | 5934388 B2 | 3/2015 |

(Continued)

OTHER PUBLICATIONS

International Search Report in PCT/KR2017/013720, dated May 11, 2018 (2 pages).

(Continued)

*Primary Examiner* — Ian A Rummel

(57) ABSTRACT

The present invention relates to a micropattern layer based image film and a method for manufacturing the same. The image film comprises: a sacrificial layer; a first micropattern layer formed on the sacrificial layer; a second micropattern layer formed on the first micropattern layer; a focal length layer formed on the second micropattern layer; and a micro-image pattern formed on the focal length layer, wherein the first micropattern layer includes a plurality of concave parts extending in one direction, and concave curved surfaces of the plurality of concave parts are formed adjacent to the sacrificial layer; the second micropattern layer includes a plurality of convex parts extending in one direction, and convex curved surfaces of the plurality of convex parts are formed adjacent to the focal length layer; and the first micropattern layer and the second micropattern layer are orthogonal to each other.

20 Claims, 5 Drawing Sheets

(51) Int. Cl.
  *B29D 11/00*   (2006.01)
  *B32B 38/00*   (2006.01)
  *B32B 37/02*   (2006.01)
  *B32B 7/06*    (2019.01)
  *B32B 38/06*   (2006.01)
  *B32B 27/36*   (2006.01)
  *B32B 3/30*    (2006.01)
  *B29C 45/00*   (2006.01)
  *B29L 11/00*   (2006.01)

(56) References Cited

FOREIGN PATENT DOCUMENTS

| | | |
|---|---|---|
| KR | 10-1131642 B1 | 3/2012 |
| KR | 10-1341072 B1 | 12/2013 |
| KR | 10-1644830 B1 | 8/2016 |
| KR | 10-1666819 B1 | 10/2016 |

OTHER PUBLICATIONS

Extended European Search Report in EP 17922678.2, dated Jul. 31, 2020.

(a)

(a)

(a)

(b)

MICROPATTERN LAYER BASED IMAGE FILM

CROSS-REFERENCE TO RELATED APPLICATIONS

This application is a continuation application of PCT International Application No. PCT/KR2017/013720, filed on Nov. 28, 2017, which claims priority from Korean Patent Application No. 10-2017-0108107, filed on Sep. 25, 2017 in the Korean Intellectual Property Office, the disclosure of which is incorporated herein in its entirety by reference.

BACKGROUND

Technical Field

The present invention relates to a micropattern layer based image film and a method of manufacturing the same, and more particularly, to a micropattern layer based image film which is capable of being formed in a thin thickness of a micron unit, and a method of manufacturing the same.

Description of the Related Art

A stereoscopic film manufacturing method has been developed and used in which a lower pattern is enlarged through a lens, such as a transparent plastic lenticular lens, using a micropattern such that the lower pattern is visually recognizable as a stereoscopic image. Such a stereoscopic film manufacturing method is applied to manufacture a label which ensures a genuine product or applied in various security businesses. The stereoscopic film manufacturing method is carried out in a micro-optic security film manufacturing manner using a high-precision micro mold. In order to form a stereoscopic image, a set of transparent plastic lenticular lenses is precisely superimposed on and aligned with a printed surface such that an image appears as a stereoscopic image by the action of the lenticular lens.

When a left-eye image and a right-eye image are alternately printed under a plastic lens which is a lenticular lens, a stereoscopic effect can be obtained by a difference in direction of left and right eyes. This is called a lenticular stereo method. This creates a manuscript by capturing a subject with perspective using a special camera (binocular camera), and plate printing performs offset printing with a flat plate of a 300 line screen.

However, according to the conventional manufacturing method, in order for a lower pattern to be enlarged through a microlens and to be visually recognizable as a stereoscopic image, a thickness of a stereoscopic film is significantly thick such that there is a problem in that a device, such as an automatic labeler, which automatically attaches the lower pattern to an actual product cannot be used.

Further, in order to solve this problem, a method of sequentially stacking lenticular lenses on a substrate layer has been proposed. In this case, however, a focal length is increased due to a two-layered lenticular layer such that there is a limitation on reducing an overall thickness of an image film.

SUMMARY

An embodiment of the present invention is directed to providing a micropattern layer-based image film having a thin thickness and a high yield as well as obtaining a more clear image, and a method of manufacturing the same.

According to an embodiment of the present invention, a micropattern layer based image film comprises a sacrificial layer, a first micropattern layer formed on the sacrificial layer, a second micropattern layer formed on the first micropattern layer, a focal length layer formed on the second micropattern layer and a micro-image pattern formed on the focal length layer, wherein the first micropattern layer includes a plurality of concave parts extending in one direction, concave curved surfaces of the plurality of concave parts are formed adjacent to the sacrificial layer, the second micropattern layer includes a plurality of convex parts extending in one direction, convex curved surfaces of the plurality of convex parts are formed adjacent to the focal length layer, and the first micropattern layer is perpendicular to the second micropattern layer.

According to another embodiment of the present invention, each of the first micropattern layer, the second micropattern layer, and the focal length layer is made of an ultraviolet curable resin.

According to another embodiment of the present invention, the sacrificial layer is formed of one material among poly-carbonate (PC) and polyethylene terephthalate (PET).

According to another embodiment of the present invention, a thickness of the focal length layer is in a range of 5 µm to 120 µm.

According to another embodiment of the present invention, the micropattern layer based image film further comprises a separable release layer between the sacrificial layer and the first micropattern layer.

According to another embodiment of the present invention, when a refractive index of the first micropattern layer is n1, a refractive index of the second micropattern layer is n2, and a refractive index of the focal length layer is n3, the refractive indexes n1, n2, and n3 satisfy a relationship of n1<n2 and n3<n2, n1 is in a range of 1.2 to 1.5, n2 is in a range of 1.51 to 1.75, and n3 is in a range of 1.2 to 1.5.

According to another embodiment of the present invention, a size of a pitch between the plurality of concave parts of the first micropattern layer is in a range of 5 µm to 60 µm, a height of a peak of each of the plurality of concave parts is in a range of 3 µm to 30 µm, a size of a pitch between the plurality of convex parts of the second micropattern layer is in a range of 5 µm to 60 µm and a height of a peak of each of the plurality of convex parts is in a range of 3 µm to 30 µm.

According to another embodiment of the present invention, when a size of a pitch of the first micropattern layer is P1 and a size of a pitch of the second micropattern layer is P2, an absolute value of a difference between P1 and P2 is less than or equal to 1 µm.

According to another embodiment of the present invention, when a size of a pitch of the micro-image pattern is P3, an absolute value of a difference between P1 and P3 is less than or equal to 1 µm.

According to another embodiment of the present invention, a distance between the plurality of concave parts and the plurality of convex parts is less than or equal to 10 µm.

According to an embodiment of the present invention, a method of manufacturing a micropattern layer based image film comprises forming a first micropattern layer on a sacrificial layer, forming a second micropattern layer on the first micropattern layer, forming a focal length layer on the second micropattern layer and forming a micro-image pattern on the focal length layer, wherein the first micropattern layer includes a plurality of concave parts extending in one direction, concave curved surfaces of the plurality of concave parts are formed adjacent to the sacrificial layer, the second micropattern layer includes a plurality of convex parts extending in one direction, convex curved surfaces of the plurality of convex parts are formed adjacent to the focal length layer, and the first micropattern layer is perpendicular to the second micropattern layer.

According to another embodiment of the present invention, the forming of the first micropattern layer includes applying an ultraviolet curable resin onto the sacrificial layer and positioning and pressing a pattern surface of a first mold, on which a micropattern is formed, on the applied ultraviolet curable resin and irradiating ultraviolet light to transfer a microlens onto an upper surface of the ultraviolet curable resin, wherein the pattern surface of the first mold is formed of a plurality of continuous convex shapes.

According to another embodiment of the present invention, the forming of the second micropattern layer includes applying an ultraviolet curable resin onto the first micropattern layer and positioning and pressing a pattern surface of a second mold, on which a micropattern is formed, on the applied ultraviolet curable resin and irradiating ultraviolet light to transfer a micropattern onto an upper surface of the ultraviolet curable resin, wherein the pattern surface of the second mold is formed of a plurality of continuous concave shapes.

According to another embodiment of the present invention, the sacrificial layer is formed of one material among poly-carbonate (PC) and polyethylene terephthalate (PET).

According to another embodiment of the present invention, a thickness of the focal length layer is in a range of 5 μm to 120 μm.

According to another embodiment of the present invention, the method further comprises forming a release layer on the sacrificial layer before the forming of the first micropattern layer.

According to another embodiment of the present invention, when a refractive index of the first micropattern layer is n1, a refractive index of the second micropattern layer is n2, and a refractive index of the focal length layer is n3, the refractive indexes n1, n2, and n3 satisfy a relationship of n1<n2 and n3<n2, n1 is in a range of 1.2 to 1.5, n2 is in a range of 1.51 to 1.75, and n3 is in a range of 1.2 to 1.5.

According to another embodiment of the present invention, a size of a pitch between the plurality of concave parts of the first micropattern layer is in a range of 5 μm to 60 μm, a height of a peak of each of the plurality of concave parts is in a range of 3 μm to 30 μm, a size of a pitch between the plurality of convex parts of the second micropattern layer is in a range of 5 μm to 60 μm and a height of a peak of each of the plurality of convex parts is in a range of 3 μm to 30 μm.

According to another embodiment of the present invention, when a size of a pitch of the first micropattern layer is P1 and a size of a pitch of the second micropattern layer is P2, an absolute value of a difference between P1 and P2 is less than or equal to 1 μm.

According to another embodiment of the present invention, when a size of a pitch of the micro-image pattern is P3, an absolute value of a difference between P1 and P3 is less than or equal to 1 μm.

According to embodiments of the micropattern layer based image film and the method of manufacturing the same, a focal length of a multilayer optical film made of a first micropattern layer, and a second micropattern layer can be reduced such that a thickness of an image film can be drastically reduced.

DETAILED DESCRIPTION OF THE EMBODIMENTS

Hereinafter, a micropattern layer based image film according to embodiments of the present invention will be described in detail with reference to the drawings.

Figure 1:
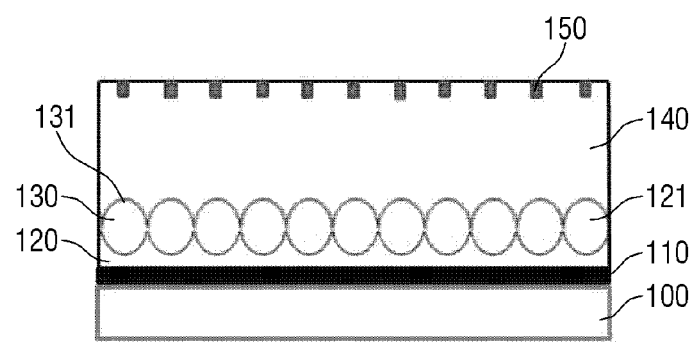
FIG. 1 is a structural diagram of a micropattern layer based image film according to an embodiment of the present invention.
Figure 1:
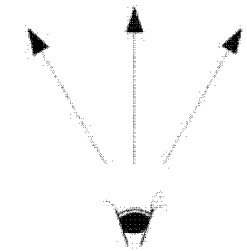

FIG. 1 is a structural diagram of a micropattern layer based image film according to an embodiment of the present invention.

As shown in FIG. 1, the micropattern layer based image film according to the embodiment of the present invention includes a sacrificial layer 100, a separable release layer 110 formed on the sacrificial layer 100, a first micropattern layer 120 formed on the sacrificial layer, a second micropattern layer 130 formed on the first micropattern layer, a focal length layer 140 formed on the second micropattern layer, and a micro-image pattern 150 formed on the focal length layer 140. In this case, a direction in which the sacrificial layer 100 is viewed is a direction of line of sight.

The release layer 110 serves to remove the sacrificial layer 100 from an image film and may be optionally employed.

The first micropattern layer 120 includes a plurality of concave parts 121, and concave curved surfaces of the plurality of concave parts 121 are formed adjacent to the sacrificial layer 100. The second micropattern layer 130 includes a plurality of convex parts 131, and convex curved surfaces of the plurality of convex parts 131 are formed adjacent to the focal length layer.

A pattern of the plurality of concave parts 121 of the first micropattern layer 120 and the plurality of convex parts 131 of the second micropattern layer 130 perform a microlens function.

For convenience of description, in FIG. 1, the first micropattern layer 120 and the second micropattern layer 130 are not shown to intersect with each other at a predetermined angle, but the first micropattern layer 120 and the second micropattern layer 130 may be formed to intersect with each other in a length direction of the pattern at an angle in a range of 88 degrees and 92 degrees.

Preferably, the first micropattern layer 120 and the second micropattern layer 130 may be disposed perpendicular to each other in the length direction.

Here, the plurality of concave parts 121 of the first micropattern layer 120 and the plurality of convex parts 131 of the second micropattern layer 130 are disposed adjacent to each other to form an egg shape. Preferably, the plurality of concave parts 121 and the plurality of convex parts 131 may be in contact with each other or may be disposed within a distance of 10 μm from each other.

The first micropattern layer 120, the second micropattern layer 130, and the focal length layer 140 may be made of an ultraviolet curable resin. The sacrificial layer may be made of poly-carbonate (PC) or polyethylene terephthalate (PET).

The focal length layer may be formed to have a thickness in a range of 5 μm to 120 μm.

The first micropattern layer 120, the second micropattern layer 130, and the focal length layer 140 may each have a predetermined refractive index such that the micro-image pattern 150 formed on the focal length layer 140 may be visually recognizable.

In this case, when a refractive index of the first micropattern layer 120 is defined as n1, a refractive index of the second micropattern layer 130 is defined as n2, and a refractive index of the focal length layer 140 is defined as n3, the refractive indexes n1, n2, and n3 satisfy a relationship of n1<n2 and n3<n2. Preferably, n1 may be in a range of 1.2 to 1.5, n2 may be in a range of 1.51 to 1.75, and n3 may be in a range of 1.2 to 1.5.

Further, a pitch between the plurality of concave parts 120 of the first micropattern layer 120 may have a size in a range of 5 μm to 60 μm, a peak of each of the plurality of concave parts 120 may be manufactured to have a height in a range of 3 μm to 30 μm, a pitch of the plurality of convex parts 131 of the second micropattern layer 130 may have a size in a range of 5 μm to 60 μm, and a peak of each of the plurality of convex parts 131 may be manufactured to have a height in a range of 3 μm to 30 μm. In this case, in the concave parts 120 or the convex parts 131, the pitch refers to a distance between two adjacent peaks of the concave parts 120 or the convex parts 131.

Further, when the size of the pitch of the first micropattern layer 120 is P1 and the size of the pitch of the second micropattern layer 130 is P2, an absolute value of a difference between P1 and P2 may be less than or equal to 1 μm.

Further, when a pitch of the micro-image pattern 151 is P3, an absolute value of a difference between P1 and P3 may be less than or equal to 1 μm.

As described above, the micropattern layer based image film according to the embodiment of the present invention forms an optical system of a multilayer structure through the arrangement, the refractive indexes, the thicknesses, the sizes of the pitches, and the heights of the peaks of the patterns of the micropattern layers. Consequently, an image of the micro-image pattern 150 may be accurately formed while reducing a thickness of the micropattern layer based image film.

Figure 2:
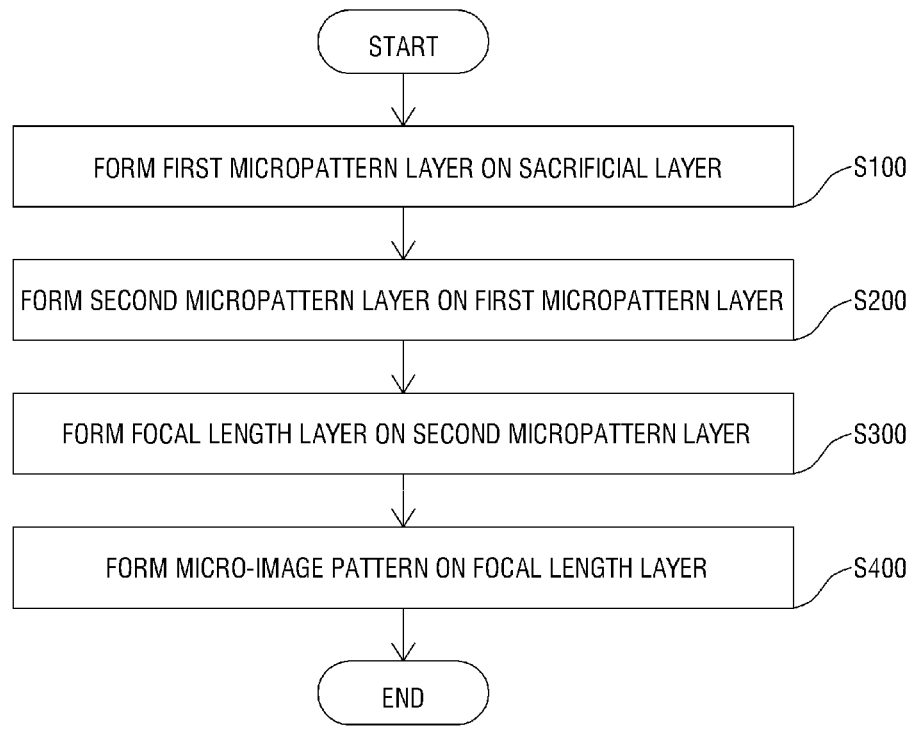
FIG. 2 is a flowchart illustrating a method of manufacturing the micropattern layer based image film according to an embodiment of the present invention.

FIG. 2 is a flowchart illustrating a method of manufacturing a micropattern layer based image film according to an embodiment of the present invention.

To describe the method of manufacturing a micropattern layer based image film according to the embodiment of the present invention with reference to FIG. 2, the first micropattern layer 120 is formed on the sacrificial layer 100 first (S100).

The method of manufacturing a micropattern layer based image film according to the embodiment of the present invention is a method of sequentially forming multiple layers on a sacrificial layer 100 to form the image film and employs a method in which layers are sequentially formed upward from the sacrificial layer 100.

To describe in further detail the formation of the first micropattern layer 120, an ultraviolet curable resin is applied onto the sacrificial layer 100, a pattern surface of a first mold on which a micropattern is formed is positioned on the applied ultraviolet curable resin and pressed, and then ultraviolet light is emitted to transfer the micropattern on an upper surface of the ultraviolet curable resin. In this case, since the pattern surface of the first mold is formed of a plurality of continuous convex shapes, a pattern of the first micropattern layer 120 includes the plurality of concave parts 121.

Then, the second micropattern layer 130 is formed on the first micropattern layer 120 (S200).

Similarly, the second micropattern layer 130 is formed such that an ultraviolet curable resin is applied onto the first micropattern layer 120, a pattern surface of a second mold on which a micropattern is formed is positioned on the applied ultraviolet curable resin and pressed, and then ultraviolet light is emitted to transfer the micropattern on an upper surface of the ultraviolet curable resin. In this case, since the pattern surface of the second mold is formed of a plurality of continuous concave shapes, a pattern of the second micropattern layer 130 includes the plurality of convex parts 131.

In this case, the first micropattern layer 120 and the second micropattern layer 130 may be formed to intersect with each other in a length direction of the pattern at an angle in a range of 88 degrees and 92 degrees.

Preferably, the first micropattern layer 120 and the second micropattern layer 130 may be disposed perpendicular to each other.

Further, the focal length layer 140 is formed on the second micropattern layer 130 (S300), and the micro-image pattern 150 is formed on the focal length layer 140 (S400). In this case, operations S300 and S400 may be simultaneously performed, and the micro-image pattern 150 may be simultaneously formed while the focal length layer 140 is formed such that manufacturing efficiency may be maximized.

Meanwhile, in the method of manufacturing a micropattern layer-based image film according to an embodiment of the present invention, the release layer 120 may be formed on the sacrificial layer 100.

Figure 3:
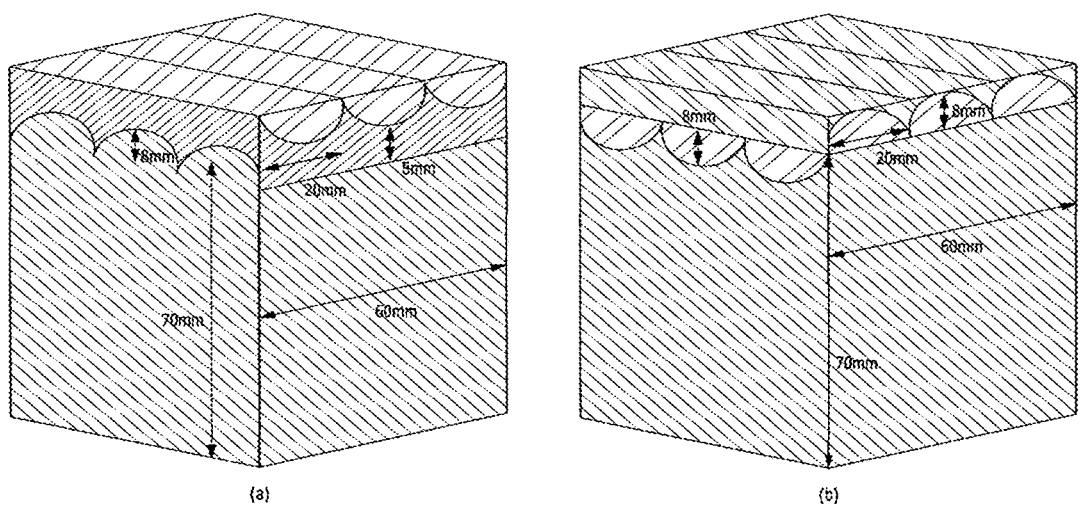
FIG. 3 is a diagram showing a structure of the micropattern layer based image film according to the embodiment of the present invention and a structure of Comparative Example.

FIG. 3 is a diagram showing a structure of the micropattern layer based image film according to the embodiment of the present invention and a structure of a Comparative Example.

FIG. 3A is a structural diagram of the conventional image film for comparing with the micropattern layer based image film according to the embodiment of the present invention, and FIG. 3B is a structural diagram of the micropattern layer based image film according to the embodiment of the present invention.

As shown in FIG. 3, the conventional image film is configured in a structure in which a convex curve of a convex pattern of the first micropattern layer 120 and a concave curve of a concave pattern of the second micropattern layer 130 are formed in a direction approaching each other, whereas the micropattern layer based image film according to the embodiment of the present invention is configured in a structure in which a concave curve of the concave parts 121 of the first micropattern layer 120 and a convex curve of the convex parts 131 of the first micropattern layer 130 are formed in a direction away from each other.

In this case, in the conventional image film and the micropattern layer based image film according to the embodiment of the present invention, performance of the micropattern layer based image film according to the embodiment of the present invention was confirmed by differentiating pattern structures and equalizing refractive indexes.

Figure 4:
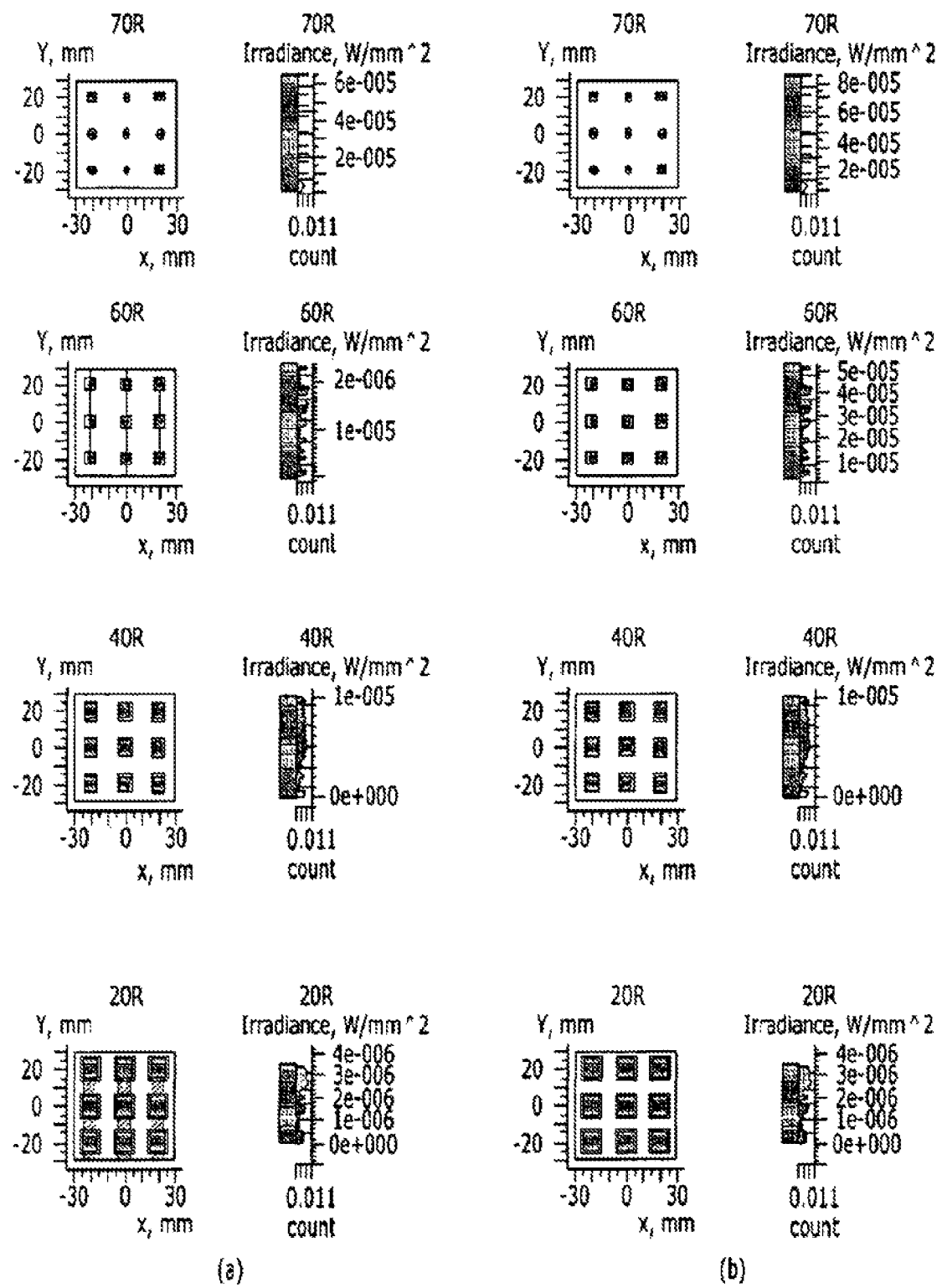
FIG. 4 is a diagram showing first simulation results of the micropattern layer based image film according to the embodiment of the present invention and Comparative Example.

FIG. 4 is a diagram showing first simulation results of the micropattern layer based image film according to the embodiment of the present invention and Comparative Example.

In order to confirm the performance of the micropattern layer based image film according to the embodiment of the present invention, an optical program capable of simulating an optical phenomenon was used to confirm the results.

In FIG. 4, a focal point of light with respect to each distance was confirmed based on vertexes (a valley or a peak of a pattern of the second micropattern layer) in the structures of FIGS. 3A and 3B.

As a result of visually expressing beam distributions at distances of 20, 40, 60, and 70 mm divided into four stages, it was confirmed that the beam distribution of the micropattern layer based image film according to the embodiment of the present invention was more excellent and had a short focal length as compared with the conventional image film.

Figure 5:
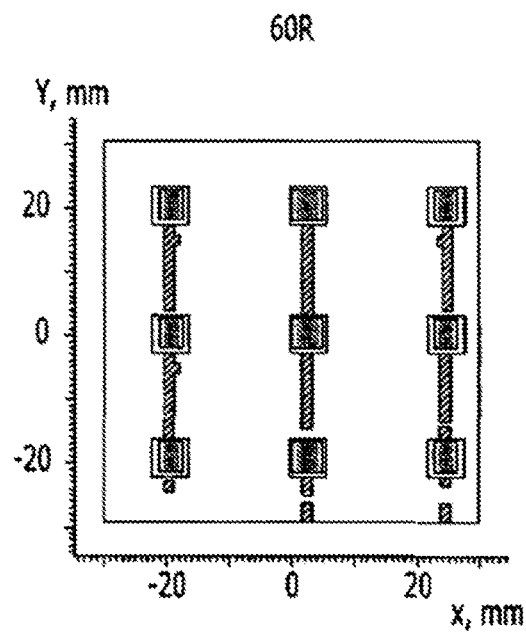
FIG. 5 is a diagram showing second simulation results of the micropattern layer based image film according to the embodiment of the present invention and Comparative Example.
Figure 5:
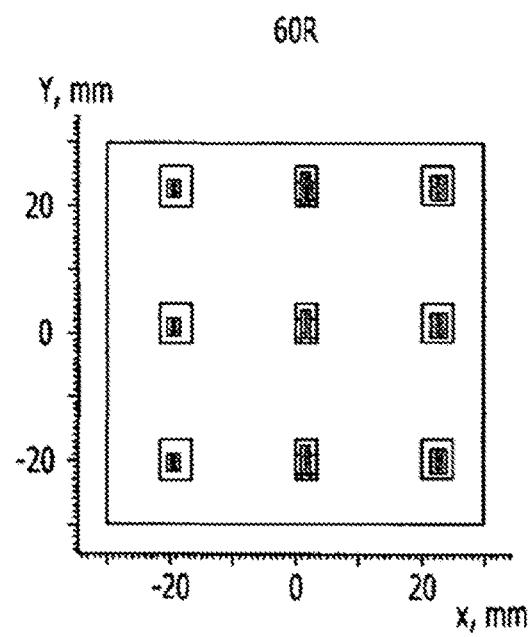

FIG. 5 is a diagram showing second simulation results of the micropattern layer based image film according to the embodiment of the present invention and Comparative Example.

FIG. 5 shows a degree of a beam distribution at a distance of 60 mm. FIG. 5A shows a simulation result with respect to the conventional image film, and FIG. 5B is a simulation result with respect to the micropattern layer based image film according to the embodiment of the present invention.

As shown in FIG. 5, it was confirmed that the micropattern layer based image film according to the embodiment of the present invention formed an image having a smaller size and had a short focal length as compared with the conventional image film.

Figure 6:
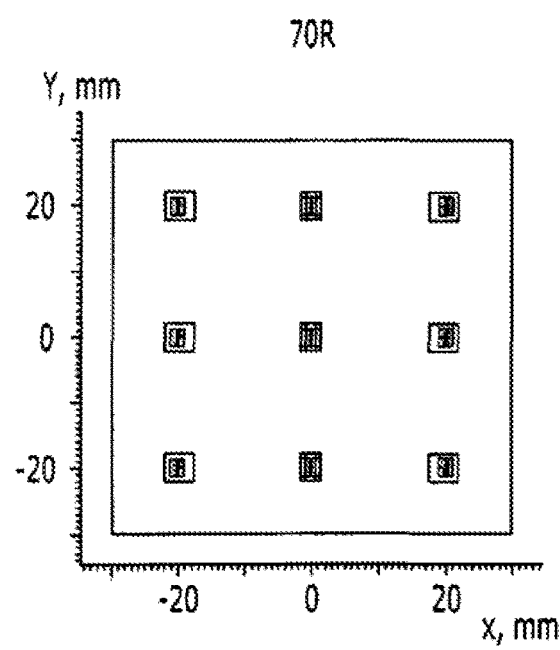
FIG. 6 is a diagram illustrating third simulation results of the micropattern layer based image film according to the embodiment of the present invention and Comparative Example.
Figure 6:
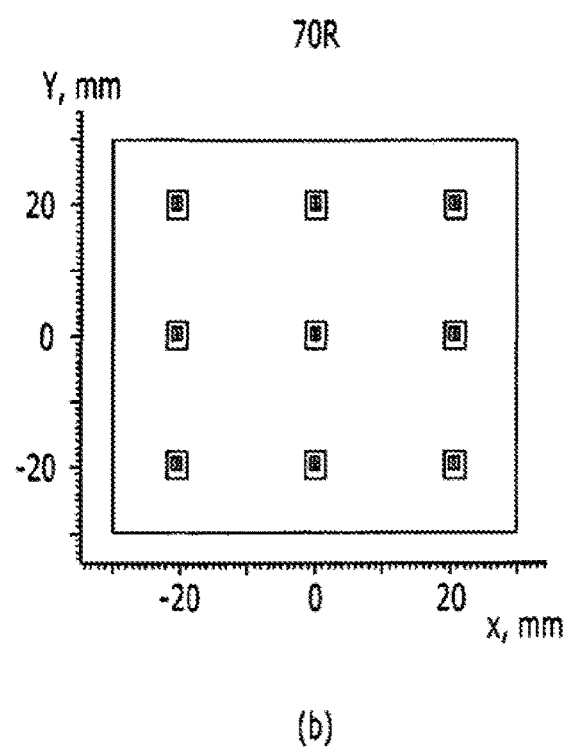

FIG. 6 is a diagram illustrating third simulation results of the micropattern layer based image film according to the embodiment of the present invention and Comparative Example.

FIG. 6 shows a degree of a beam distribution at a distance of 70 mm. FIG. 6A shows a simulation result with respect to the conventional image film, and FIG. 6B is a simulation result with respect to the micropattern layer based image film according to the embodiment of the present invention.

As shown in FIG. 6, it was confirmed that the micropattern layer based image film according to the embodiment of the present invention formed an image having a smaller size and had a short focal length as compared with the conventional image film.

As described above, in accordance with the micropattern layer based image film according to the embodiment of the present invention, a focal length can be shorter to reduce a thickness of the focal length layer. Consequently, an overall thickness of the micropattern layer based image film can be drastically reduced.

While the exemplary embodiments of the present invention have been described, various alternations and modifications can be devised by those skilled in the art by addition, alternation, deletion, supplement, or the like of components without departing from the spirit of the present invention defined by the appended claims, and it should be understood that these alternations and modifications fall within the scope of the present invention.

What is claimed is:

1. A micropattern layer based image film comprising:
a sacrificial layer;
a first micropattern layer formed on the sacrificial layer;
a second micropattern layer formed on the first micropattern layer;
a focal length layer formed on the second micropattern layer; and
a micro-image pattern formed on the focal length layer,
wherein the first micropattern layer includes a plurality of concave parts extending in one direction,
concave curved surfaces of the plurality of concave parts are formed adjacent to the sacrificial layer,
the second micropattern layer includes a plurality of convex parts extending in one direction,
convex curved surfaces of the plurality of convex parts are formed adjacent to the focal length layer, and
the first micropattern layer is perpendicular to the second micropattern layer.

2. The micropattern layer based image film of claim 1, wherein each of the first micropattern layer, the second micropattern layer, and the focal length layer is made of an ultraviolet curable resin.

3. The micropattern layer based image film of claim 1, wherein the sacrificial layer is formed of one material among poly-carbonate (PC) and polyethylene terephthalate (PET).

4. The micropattern layer based image film of claim 1, wherein a thickness of the focal length layer is in a range of 5 μm to 120 μm.

5. The micropattern layer based image film of claim 1, further comprising a separable release layer between the sacrificial layer and the first micropattern layer.

6. The micropattern layer based image film of claim 1, wherein, when a refractive index of the first micropattern layer is n1, a refractive index of the second micropattern layer is n2, and a refractive index of the focal length layer is n3, the refractive indexes n1, n2, and n3 satisfy a relationship of n1<n2 and n3<n2, n1 is in a range of 1.2 to 1.5, n2 is in a range of 1.51 to 1.75, and n3 is in a range of 1.2 to 1.5.

7. The micropattern layer based image film of claim 1, wherein:
a size of a pitch between the plurality of concave parts of the first micropattern layer is in a range of 5 μm to 60 μm;
a height of a peak of each of the plurality of concave parts is in a range of 3 μm to 30 μm;
a size of a pitch between the plurality of convex parts of the second micropattern layer is in a range of 5 μm to 60 μm; and
a height of a peak of each of the plurality of convex parts is in a range of 3 μm to 30 μm.

8. The micropattern layer based image film of claim 1, wherein, when a size of a pitch of the first micropattern layer is P1 and a size of a pitch of the second micropattern layer is P2, an absolute value of a difference between P1 and P2 is less than or equal to 1 μm.

9. The micropattern layer based image film of claim 8, wherein, when a size of a pitch of the micro-image pattern is P3, an absolute value of a difference between P1 and P3 is less than or equal to 1 μm.

10. The micropattern layer based image film of claim 1, wherein a distance between the plurality of concave parts and the plurality of convex parts is less than or equal to 10 μm.

11. A method of manufacturing a micropattern layer based image film, comprising:

forming a first micropattern layer on a sacrificial layer;

forming a second micropattern layer on the first micropattern layer;

forming a focal length layer on the second micropattern layer; and forming a micro-image pattern on the focal length layer, wherein the first micropattern layer includes a plurality of concave parts extending in one direction, concave curved surfaces of the plurality of concave parts are formed adjacent to the sacrificial layer, the second micropattern layer includes a plurality of convex parts extending in one direction, convex curved surfaces of the plurality of convex parts are formed adjacent to the focal length layer, and the first micropattern layer is perpendicular to the second micropattern layer.

12. The method of claim 11, wherein the forming of the first micropattern layer includes:

applying an ultraviolet curable resin onto the sacrificial layer; and positioning and pressing a pattern surface of a first mold, on which a micropattern is formed, on the applied ultraviolet curable resin and irradiating ultraviolet light to transfer a microlens onto an upper surface of the ultraviolet curable resin, wherein the pattern surface of the first mold is formed of a plurality of continuous convex shapes.

13. The method of claim 11, wherein the forming of the second micropattern layer includes:

applying an ultraviolet curable resin onto the first micropattern layer; and positioning and pressing a pattern surface of a second mold, on which a micropattern is formed, on the applied ultraviolet curable resin and irradiating ultraviolet light to transfer a micropattern onto an upper surface of the ultraviolet curable resin, wherein the pattern surface of the second mold is formed of a plurality of continuous concave shapes.

14. The method of claim 11, wherein the sacrificial layer is formed of one material among poly-carbonate (PC) and polyethylene terephthalate (PET).

15. The method of claim 11, wherein a thickness of the focal length layer is in a range of 5 μm to 120 μm.

16. The method of claim 11, further comprising, before the forming of the first micropattern layer, forming a release layer on the sacrificial layer.

17. The method of claim 11, wherein, when a refractive index of the first micropattern layer is n1, a refractive index of the second micropattern layer is n2, and a refractive index of the focal length layer is n3, the refractive indexes n1, n2, and n3 satisfy a relationship of n1<n2 and n3<n2, n1 is in a range of 1.2 to 1.5, n2 is in a range of 1.51 to 1.75, and n3 is in a range of 1.2 to 1.5.

18. The method of claim 11, wherein:

a size of a pitch between the plurality of concave parts of the first micropattern layer is in a range of 5 μm to 60 μm;

a height of a peak of each of the plurality of concave parts is in a range of 3 μm to 30 μm;

a size of a pitch between the plurality of convex parts of the second micropattern layer is in a range of 5 μm to 60 μm; and a height of a peak of each of the plurality of convex parts is in a range of 3 μm to 30 μm.

19. The method of claim 11, wherein, when a size of a pitch of the first micropattern layer is P1 and a size of a pitch of the second micropattern layer is P2, an absolute value of a difference between P1 and P2 is less than or equal to 1 μm.

20. The method of claim 19, wherein, when a size of a pitch of the micro-image pattern is P3, an absolute value of a difference between P1 and P3 is less than or equal to 1 μm.

* * * * *